(12) United States Patent
Kim et al.

(10) Patent No.: US 10,441,094 B2
(45) Date of Patent: Oct. 15, 2019

(54) GOODS DISPLAY RACK

(71) Applicant: SEIDAE INDUSTRIAL CO., LTD., Goyang, Gyeonggi-do (KR)

(72) Inventors: Moonsik Kim, Gyeonggi-do (KR); Hongkeun Lee, Gyeonggi-do (KR)

(73) Assignee: SEIDAE INDUSTRIAL CO., LTD., Goyang, Gyeonggi-do (KR)

( * ) Notice: Subject to any disclaimer, the term of this patent is extended or adjusted under 35 U.S.C. 154(b) by 0 days.

(21) Appl. No.: 16/060,052

(22) PCT Filed: Apr. 14, 2016

(86) PCT No.: PCT/KR2016/003902
§ 371 (c)(1),
(2) Date: Jun. 7, 2018

(87) PCT Pub. No.: WO2017/104907
PCT Pub. Date: Jun. 22, 2017

(65) Prior Publication Data
US 2018/0360236 A1 Dec. 20, 2018

(30) Foreign Application Priority Data
Dec. 15, 2015 (JP) .................. 10-2015-0179442

(51) Int. Cl.
*A47F 5/10* (2006.01)
*A47F 5/00* (2006.01)
(Continued)

(52) U.S. Cl.
CPC .................. *A47F 5/10* (2013.01); *A47F 1/04* (2013.01); *A47F 1/12* (2013.01); *A47F 5/00* (2013.01);
(Continued)

(58) Field of Classification Search
CPC .. A47F 1/12; A47F 1/125; A47F 5/005; A47F 5/0093; A47F 1/126; A47F 5/0018;
(Continued)

(56) References Cited

U.S. PATENT DOCUMENTS

| 431,373 A | * | 7/1890 | Mendenhall | ........... A47B 65/00 211/43 |
| 4,792,051 A | * | 12/1988 | Miller | ..................... A47F 5/005 108/61 |

(Continued)

FOREIGN PATENT DOCUMENTS

| JP | 2006-239137 A | 9/2006 |
| JP | 2007-054144 A | 3/2007 |

(Continued)

OTHER PUBLICATIONS

International Search Report for International Application No. PCT/KR2016/003902, dated Aug. 31, 2016, 2 pages.
(Continued)

*Primary Examiner* — Hiwot E Tefera
(74) *Attorney, Agent, or Firm* — Mintz Levin Cohn Ferris Glovsky and Popeo, P.C.; Kongsik Kim; Jhongwoo Jay Peck

(57) ABSTRACT

A goods display rack according to one embodiment of the present invention comprises: at least one goods transfer unit configured so as to transfer goods placed on an upper surface to a withdrawal position; a front fixing profile arranged on the front of the goods display rack so as to attachably/detachably fix a front end of the goods transfer unit; and a rear fixing profile arranged on the rear of the goods display rack so as to attachably/detachably fix a rear end of the goods transfer unit, wherein the goods transfer unit is configured so as to slide to the left and right sides in a position-adjustable area between the front fixing profile and the rear fixing profile, in a state in which the front end and
(Continued)

the rear end thereof are respectively mounted in the front fixing profile and the rear fixing profile.

13 Claims, 21 Drawing Sheets

(51) Int. Cl.
*B65G 1/02* (2006.01)
*A47F 1/12* (2006.01)
*A47F 5/16* (2006.01)
*A47F 1/04* (2006.01)

(52) U.S. Cl.
CPC ............ *A47F 5/005* (2013.01); *A47F 5/0018* (2013.01); *A47F 5/0081* (2013.01); *A47F 5/0093* (2013.01); *A47F 5/16* (2013.01); *B65G 1/023* (2013.01); *B65G 1/026* (2013.01)

(58) Field of Classification Search
CPC ........ A47F 5/0062; A47F 5/10; A47F 5/0081; A47F 1/04; A47F 5/16; A47F 5/00; B65G 13/11; B65G 1/023; B65G 1/026; B65G 39/12; A47B 96/021; A47B 57/585; A47B 57/583; A47B 57/588; A47B 57/586; A47B 57/58; A47B 96/025
USPC ............. 211/184, 151, 59.2, 59.3, 59.4, 134, 211/DIG. 1, 43; 193/35 R; 414/267, 276
See application file for complete search history.

(56) References Cited

U.S. PATENT DOCUMENTS

| | | | |
|---|---|---|---|
| 5,839,588 A * | 11/1998 | Hawkinson | A47F 1/126 211/59.3 |
| 6,155,438 A * | 12/2000 | Close | A47F 1/125 211/119.003 |
| 6,227,385 B1 * | 5/2001 | Nickerson | A47F 1/126 108/61 |
| 6,497,326 B1 * | 12/2002 | Osawa | A47F 7/28 211/59.2 |
| 6,923,330 B1 | 8/2005 | Nagel | |
| 8,317,040 B2 * | 11/2012 | Lanning | A47B 88/90 108/60 |
| D702,067 S | 4/2014 | Kim | |
| 9,016,482 B2 * | 4/2015 | Kim | A47F 1/126 211/59.2 |
| 2001/0002659 A1 * | 6/2001 | Bada | A47B 57/583 211/59.2 |
| 2005/0224437 A1 * | 10/2005 | Lee | A47F 5/005 211/184 |
| 2006/0049122 A1 * | 3/2006 | Mueller | A47F 1/126 211/59.3 |
| 2007/0090068 A1 * | 4/2007 | Hardy | A47F 1/126 211/59.3 |
| 2008/0296241 A1 * | 12/2008 | Alves | A47F 5/005 211/90.04 |
| 2014/0190917 A1 * | 7/2014 | Szpak | A47F 1/04 211/134 |
| 2014/0263134 A1 * | 9/2014 | Walker | A47F 5/005 211/184 |
| 2014/0299560 A1 * | 10/2014 | Kim | A47F 1/126 211/59.2 |

FOREIGN PATENT DOCUMENTS

| | | |
|---|---|---|
| KR | 20-0327237 Y1 | 9/2003 |
| KR | 10-2005-0094775 A | 9/2005 |
| KR | 30-0713128 S | 10/2013 |
| WO | 2007/050527 A2 | 5/2007 |

OTHER PUBLICATIONS

Supplementary European Search Report corresponding to European Patent Application No. 16875849.8, dated May 13, 2019, 6 pages.

* cited by examiner

GOODS DISPLAY RACK

CROSS-REFERENCES TO RELATED APPLICATIONS

This application is a U.S. national phase application, pursuant to 35 U.S.C. § 371, of PCT/KR2016/003902, filed on Apr. 14, 2016, designating the United States, which claims priority to Korean Application No. 10-2015-0179442, filed on Dec. 15, 2015. The entire contents of the aforementioned patent applications are incorporated herein by this reference.

TECHNICAL FIELD

The present disclosure relates to a goods display rack, and more particularly, to a goods display rack having a goods transfer unit which is configured to be attachable to or detachable from fixing profiles and to be slidable sideways in a position adjustment area of the fixing profiles by external force, so that the number and arrangement positions of goods transfer units may be controlled.

BACKGROUND ART

These days, a device for enabling continuous display of products is installed on the front end of a goods display rack in a retail store such as a supermarket, a hypermarket, a convenience store, or a drug store, so as to facilitate a user to identify, input/output, move, manage, and select products. Herein, the term "user" may cover a retail inventory manager, an employee of a products supply company, a research engineer of a pharmaceutical company, a logistics warehouse worker, and an inventory manager or chef of a restaurant as well as a consumer which purchases a product. In this display device, when a product displayed on the rack is withdrawn, the next product usually slides to the front end of the rack due to the tilt of the rack at a specific angle. The rack is equipped with a goods transfer member configured to enable the next product to slide to an empty space from which a product has been withdrawn, on the front end of the rack, and a partitioning guide member configured to allow display of products in a row. The rack to which these components are mounted should be designed in consideration of, for example, the display areas and sizes of products, the states of the products such as liquid, solid, or gas, the shapes and types of the products, temperatures at which the products should be kept, the materials of vessels of the products, the exterior complexity of product packages, change of sections of the products on a display shelf, the display heights of the products, and the safety of the products. In most cases, products are displayed appropriately according to the types of racks designated based on the types and vessel materials of the products.

FIG. 1 illustrates a conventional goods display rack in which a goods base 100 is mounted tilted, while being fixed on the rack by support means 700 so that a product slides downward on the top surface of the goods base 100. In this conventional goods display rack, however, the goods base 100 is integrally formed, and thus only specific products matching to the size of the rack may be arranged. If the type, size, package unit, vessel material, or display section of an arranged product is changed, a retail display stand plan, the position of a product in stock, or a product display plan is changed, the goods base has defects, thus requiring repair, or the goods base is contaminated, thus requiring cleaning, all products arranged on the goods base should be taken out and then the whole goods base should be removed. Particularly, even when a part of the goods base is too damaged to be repaired, the goods base itself should be replaced.

DISCLOSURE

Technical Problem

The present invention is devised to address the above-mentioned problems. Accordingly, an aspect of the present disclosure is to provide a goods display rack which enables control of the number and arrangement positions of goods transfer units.

Technical Solution

According to an embodiment of the present disclosure, a goods display rack includes: at least one goods transfer unit configured to transfer a product mounted on a top surface thereof to a withdrawal position; a front fixing profile disposed on the front of the goods display rack, and configured to attachably/detachably fix a front end of the goods transfer unit; and a rear fixing profile disposed on the rear of the goods display rack, and configured to attachably/detachably fix a rear end of the goods transfer unit. The goods transfer unit is configured to slide from side to side in a position adjustment area between the front fixing profile and the rear fixing profile, with the front end and the rear end thereof mounted respectively to the front fixing profile and the rear fixing profile.

Further, the front end of the goods transfer unit is vertically detachable from the front fixing profile, and the rear end of the goods transfer unit is horizontally detachable from the rear fixing profile.

Further, a recess may be formed into the bottom surface of the goods transfer unit, extended along the left and right directions of the goods display rack, and the front fixing profile may include a front end support plate supporting the front end of the goods transfer unit upward, under the goods transfer unit, and a protrusion configured to protrude from the top surface of the front end support plate, extended along the left and right directions, and to be inserted into the recess of the goods transfer unit.

Further, the rear fixing profile may include a rear end support plate supporting the rear end of the goods transfer unit upward, under the goods transfer unit, and an auxiliary plate extended upward from the rear end support plate, and then forward above the rear end support plate. An accommodation space may be formed in the rear fixing profile, extended along the left and right directions by the rear end support plate and the auxiliary plate, and the rear end of the goods transfer unit may be accommodated in the accommodation space.

Further, when the goods transfer unit is engaged with the fixing profiles, the rear end of the goods transfer unit may be horizontally inserted into the accommodation space of the rear fixing profile, and the protrusion of the front fixing profile may be vertically inserted into the recess of the front end of the goods transfer unit. When the goods transfer unit is removed from the fixing profiles, the protrusion of the front fixing profile may be vertically detached from the recess of the front end of the goods transfer unit, and the rear end of the goods transfer unit may be horizontally detached from the accommodation space of the rear fixing profile.

Further, the recess may include a bottom surface, and two opposite surfaces facing each other, with the bottom surface in between, and a flange may be formed on a top end of the protrusion. A magnetic device or a double-sided Velcro device may be formed on each of the bottom surface of the recess and the top surface of the flange.

Further, bumpers may be formed apart from each other on the two opposite surfaces, extended along the left and right directions of the recess. When the protrusion is inserted into the recess, the front end of the goods transfer unit and the front fixing profile may be engaged with each other by forced insertion of the protrusion into the recess through temporary friction between the flange and the bumpers, and when the protrusion is detached from the recess, the front end of the goods transfer unit and the front fixing profile may be separated from each other through temporarily friction between the flange and the bumpers.

Further, the goods transfer unit may be a roller unit in which a plurality of rollers are rotatably engaged with a roller support.

Further, one of a surface-processed solid metal sheet, a thin gauge sheet formed of synthetic resin by extrusion molding, and a non-crystalline solid-overcooled liquid sheet may be formed on the top surface of the goods transfer unit.

Further, the goods display rack may further include a panel bonded to the front end support plate and the rear end support plate, and supporting the front fixing profile and the rear fixing profile upward.

Further, the goods display rack may further include a first bracket and a second bracket attached to the front fixing profile and the rear fixing profile, respectively on left and right end portions of the goods display rack. The heights of the first and second brackets may become larger toward the rears of the first and second brackets.

Further, the front end support plate of the front fixing profile and the rear end support plate of the rear fixing profile may be integrally formed.

Advantageous Effects

In a goods display rack according to an embodiment of the present disclosure, a goods transfer unit is configured to be attachable to and detachable from the goods display rack. Therefore, when a specific unit is defective or out of order, the unit has only to be replaced with a new unit, thus making it possible to continuously use the goods display rack.

Further, since goods transfer units are attachable and detachable, the goods display rack can be easily modified by adopting various types of goods transfer units in combination.

Further, since goods transfer units are attachable and detachable, goods transfer units can be selected for the purpose of display or loading, or according to the characteristics of products. For example, if an initial plan is changed, it is possible to replace a goods transfer unit with a general unit without an auxiliary gravity movement means such as a roller or a sheet, instead of a roller unit.

Further, since goods transfer units are configured to be slidable sideways on the goods display rack, the goods display rack can be configured in various shapes according to a condition such as the left-right sizes of displayed products. Therefore, products can be stably placed by adopting as many units as needed, thereby saving cost which might be otherwise caused by use of unnecessary units.

MODE FOR CARRYING OUT THE INVENTION

The objects and effects of the present disclosure, and technical configurations for achieving them will be apparent from embodiments described below in conjunction with the attached drawings. In describing the present disclosure, a detailed description of a known function or structure will be avoided lest it should obscure the subject matter of the present disclosure. The later-described terms are defined in consideration of structures, roles, and functions in the present disclosure, and may be changed according to the intention of a user or an operator, or customs.

However, the present disclosure may be implemented in various manners, not limited to the following embodiments. Rather, the embodiments are provided to make the present disclosure comprehensive and help those skilled in the art to comprehensively understand the scope of the present disclosure, and the present disclosure is defined only by the appended claims. Therefore, the definition should be made based on what lies throughout the specification.

Throughout the specification, when it is said that some part "includes" a component, this means that any other component may further be included, not excluding other components, unless otherwise mentioned.

The present disclosure relates to a goods display rack on which a combination of goods transfer units for transferring a product to a withdrawal position on the front end thereof by a gravity flow are arranged attachably/detachably to and from fixing profiles. The goods display rack is installed on a display table (not shown) in a fridge, a freezer, an open cooler, or the like, for the purpose of arranging, displaying, loading, keeping, selling, or preserving products in a space or place selling products or providing services, such as a shop, a convenience store, a drug store, or a clinic. In addition, the goods display rack may be used in a vendor machine, a storage cabinet of a kitchen, or a raw material management line or production line of a factory.

Now, a detailed description will be given of preferred embodiments of the present disclosure with reference to the attached drawings.

Figure 1:
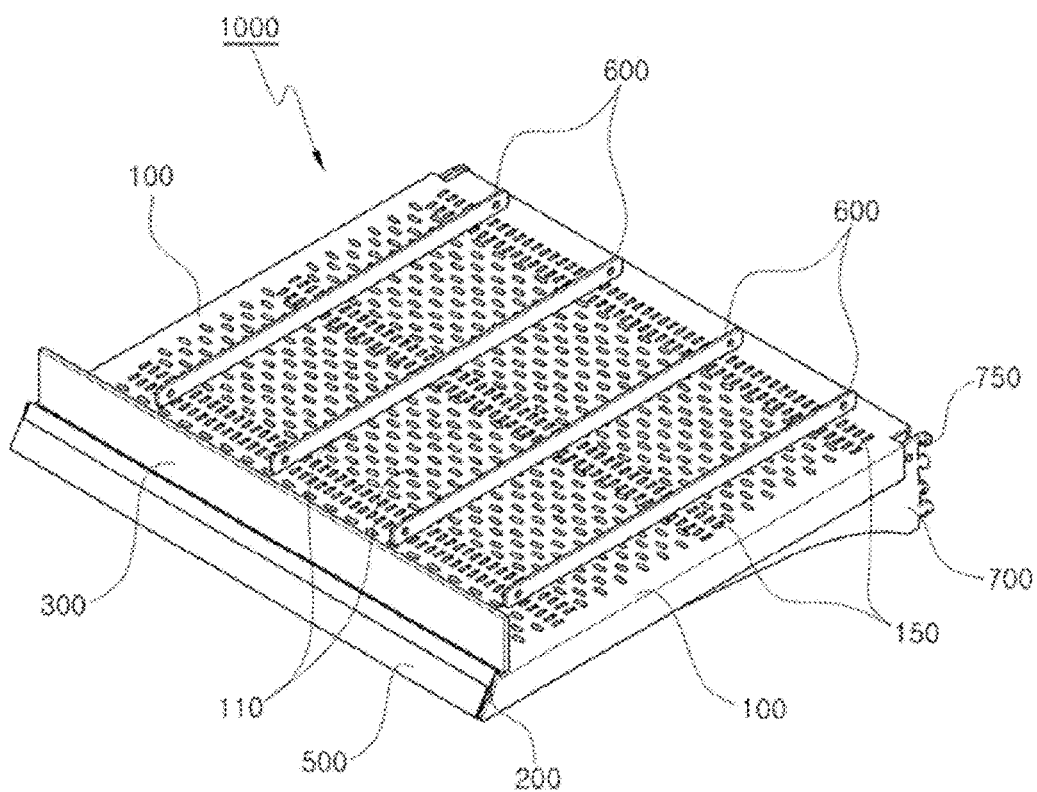
FIG. 1 is a perspective view illustrating a conventional goods display rack.
Figure 2:
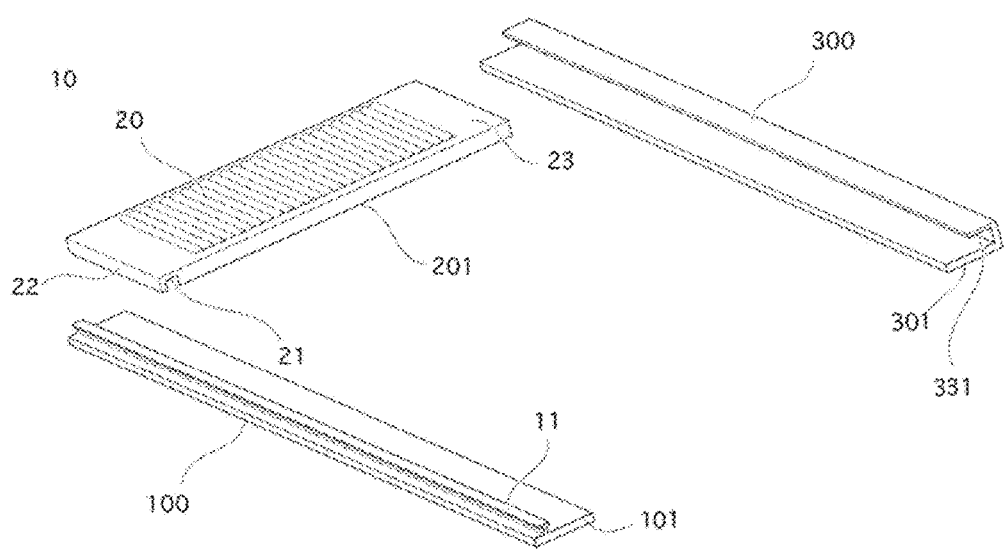
FIG. 2 is an exploded perspective view illustrating the structure of a goods display rack according to an embodiment of the present disclosure.
Figure 3:
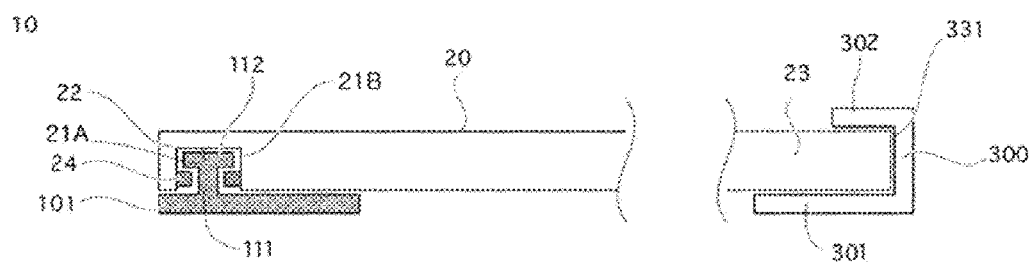
FIG. 3 is a sectional view of a goods display rack according to an embodiment.
Figure 4:
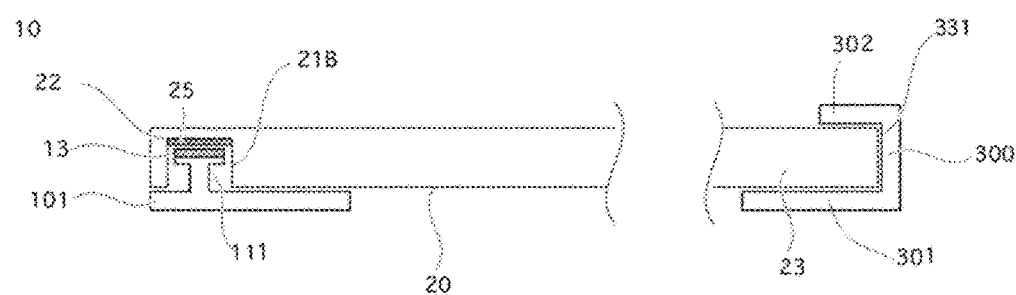
FIG. 4 is a sectional view of a goods display rack according to another embodiment.

FIG. 2 is an exploded perspective view illustrating the structure of a goods display rack 10 according to an embodiment of the present disclosure, and FIGS. 3 and 4 are sectional views of the goods display rack 10 according to an embodiment. As illustrated, the goods display rack 10 includes a goods transfer unit 20, and fixing profiles 100 and 300.

The goods transfer unit (hereinafter, also referred to as a "unit") 20 is so configured that a product is mounted on the top surface thereof and transferred to a withdrawal position on the front of the goods transfer rack 10, and is attachably/detachably engaged with the later-described fixing profiles 100 and 300. Although the goods transfer unit 20 is not limited to any particular shape, the goods transfer unit 20 may be formed into a rectangle having a length from a front end 22 to a rear end 23 larger than a width. The lengthwise front end 22 of the unit 20 is engaged with the front fixing profile 100, and the lengthwise rear end 23 is engaged with the rear fixing profile 300. A plurality of goods transfer units 20 may be arranged side by side in an area between the front and rear fixing profiles 100 and 300, that is, on the left and right sides of a position adjustment area 500, along the width direction of the goods transfer units 20. Once the goods transfer unit 20 is mounted on the rack 10, the front fixing profile 100 is positioned lower than the rear fixing profile 300, thereby maintaining a tilted state in which the front end 22 of the unit 20 engaged with the front fixing profile 100 is lower than the rear end 23 of the unit 20 engaged with the rear fixing profile 300. Therefore, a product moves from the rear end 23 of the unit 20 toward the front end of the unit 20 by gravity.

Figure 5:
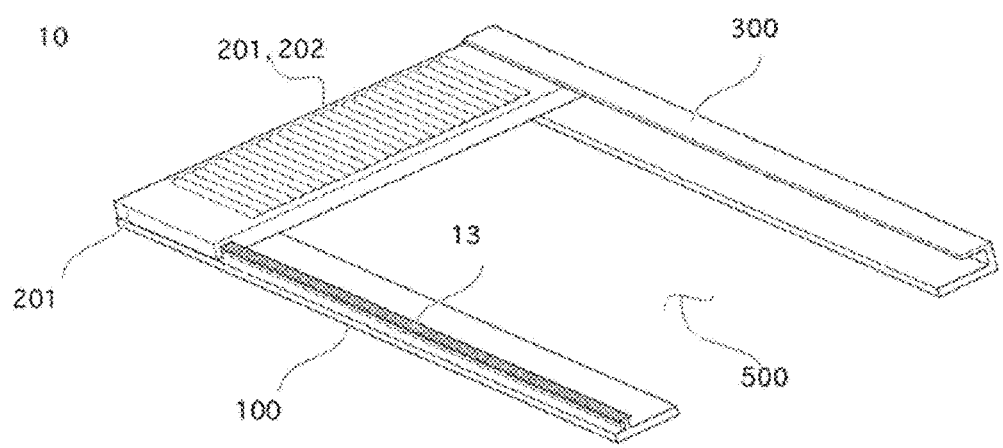
FIG. 5 is a perspective view illustrating an embodiment in which a goods transfer unit is a roller unit.
Figure 6:
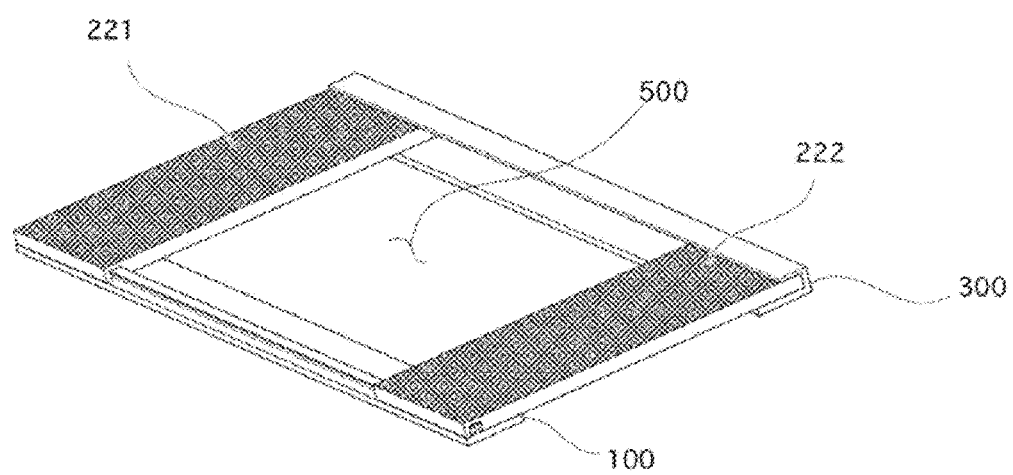
FIG. 6 is a perspective view illustrating an embodiment in which a surface-processed solid metal sheet is formed on the top surface of a goods transfer unit.
Figure 7:
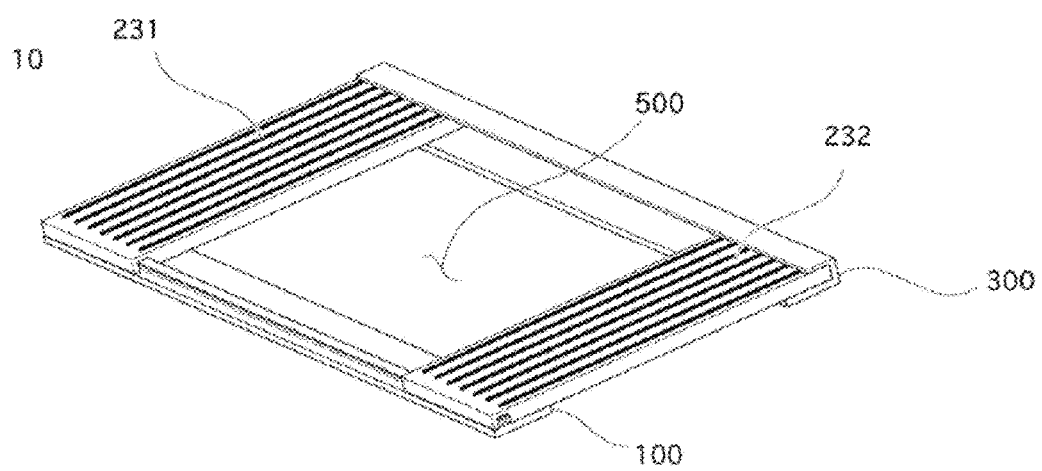
FIG. 7 is a perspective view illustrating an embodiment in which a thin gauge sheet formed of synthetic resin by extrusion molding is formed on the top surface of a goods transfer unit.

A roller unit 201 or 202 in which a plurality of rollers are rotatably engaged with a roller support, or a unit on which one of a surface-processed solid metal sheet 221 or 222, a thin gauge sheet 231 or 232 formed of synthetic resin by extrusion molding, and a non-crystalline solid-overcooled liquid sheet is formed may be adopted as an embodiment of the goods transfer unit 20. FIG. 5 is a perspective view illustrating an embodiment in which goods transfer units are the roller units 201 and 202, FIG. 6 is a perspective view illustrating an embodiment in which the surface-processed solid metal sheets 221 and 222 are formed on the top surfaces of goods transfer units, and FIG. 7 is a perspective view illustrating an embodiment in which the thin gauge sheets 231 and 232 formed of synthetic resin by extrusion molding are formed on the top surfaces of goods transfer units. In the case of the roller units 201 and 202 illustrated in FIG. 5, the goods transfer units may be so configured that a plurality of rollers may be arranged in a row along the length direction of an outer casing in a space between the front end 22 and rear end 23 of the outer casing, rotatably with respect to the outer casing in each of the goods transfer units. In this case, products make forward cloud movement on the top surfaces of the roller units 201 and 202. In the case of the goods transfer units in the embodiment illustrated in FIG. 6 or FIG. 7, since the solid metal sheets 221 and 222 having surfaces processed to be smooth, the thin gauge sheets 231 and 232 formed of synthetic resin by extrusion molding, or non-crystalline solid-overcooled liquid sheets are formed on the top surfaces of the goods transfer units, products may slide forward on the top surfaces of the goods transfer units.

Meanwhile, as illustrated in FIGS. 2 and 3 or FIGS. 2 and 4, a recess 21 is formed into the bottom surface of the front end 22 of the goods transfer unit 20, extended to the left and right on the goods display rack 10. The recess 21 is a space in which a later-described protrusion 111 is accommodated. The recess 21 is preferably linear in order to allow the unit 20 to slide from side to side on the goods transfer rack 10 with respect to the front fixing profile 100, with the recess 21 engaged with the protrusion 111 of the front fixing profile 100. In addition, the section of the recess 21 cut along the length direction of the unit 20 may be shaped into a square with an open bottom. Specifically, the recess 21 includes a bottom surface 21A and two opposite surfaces 21B facing each other with the bottom surface 21A in between.

A bumper 24 may be formed on each of the two opposite surfaces 21B, extended along the left and right directions of the recess 21. The bumpers 24 are spaced from the bottom surface 21A of the recess 21, thereby producing a specific gap between the bumpers 24. The protrusion 111 of the later-described front fixing profile 100 is inserted through the gap. The bumpers 24 may be formed to be elastic members of, for example, rubber in order to cushion between the unit 20 and the front fixing profile 100, not limited to any particular material.

Further, as illustrated in FIG. 3 or 4, an attaching member 25 such as a magnetic device like a magnet or a Velcro device like Velcro cloth may be mounted on the bottom surface 21A of the recess 21. As a magnetic device or a double-sided Velcro device is attached on the top surface of a later-described flange 112 of the protrusion 111, the unit 20 may be attached to and detached from the front fixing profile 100 by a magnetic force or in a so-called Velcro manner.

Meanwhile, the fixing profiles 100 and 300 are configured to attachably/detachably fix the goods transfer unit 20. The fixing profiles 100 and 300 are the front fixing profile 100 which is disposed on the front of the goods display rack 10 and attachably/detachably fixes the front end 22 of the unit 20, and the rear fixing profile 300 which is disposed on the rear of the goods display rack 10 and attachably/detachably fixes the rear end 23 of the unit 20.

First, the front fixing profile 100 is configured to be disposed under the front end 22 of the unit 20, and support up and fix the front end 22 of the unit 20. As illustrated in FIGS. 2, 3 and 4, the front fixing profile 100 includes a front end support plate 101 and the protrusion 111. These components may be formed integrally in the fabrication process of extrusion, molding, or injection, or may be formed separately and then engaged with one another. The front end support plate 101 supports the front end 22 of the unit 20 upward, with a part of the top surface thereof partially contacting the bottom surface of the front end 22 of the unit 20. The protrusion 111 is configured to be inserted in the recess 21 of the unit 20, thus fixing the unit 20 in a back and forth direction. The protrusion 111 protrudes from the top surface of the front end support plate 101 and is extended along the left and right directions. That is, the protrusion 111 functions as a rail for the recess 21 of the unit 20. Herein, the flange 112 protrudes forward and backward on the top end of the protrusion 111, and is extended in the left and right directions along the protrusion 111. As described above, a magnetic device or a double-sided Velcro device may be formed on the top surface of the flange 112.

Meanwhile, the rear fixing profile 300 is configured to be disposed under the rear end 23 of the unit 20, and support up and fix the rear end 23 of the unit 20. The rear fixing profile 300 includes a rear end support plate 301 and an auxiliary plate 302. These components may be formed integrally in a fabrication process, or may be formed separately and then engaged with one another. As illustrated in FIGS. 2, 3 and 4, the rear end support plate 301 supports the rear end 23 of the unit 20 upward, with the top surface thereof contacting the bottom surface of the rear end 23 of the unit 20. The auxiliary plate 302 is extended upward from the rear end of the rear end support plate 301 and then forward above the rear end support plate 301, thus being shaped into ¬. According to this structure, the rear fixing profile 300 forms an inner accommodation space 331 surrounded by the rear end support plate 301 and the ¬-shaped auxiliary plate 302. The accommodation space 331 is extended along the left and right directions of the rear fixing profile 300, and the rear end 23 of the goods transfer unit 20 is accommodated and injection-fixed in the accommodation space 331. Herein, it is preferred from the viewpoint of fixing the unit 20 that the height of the accommodation space 331 is equal to or slightly larger than the thickness of the rear end 23 of the unit 20.

Figure 8:
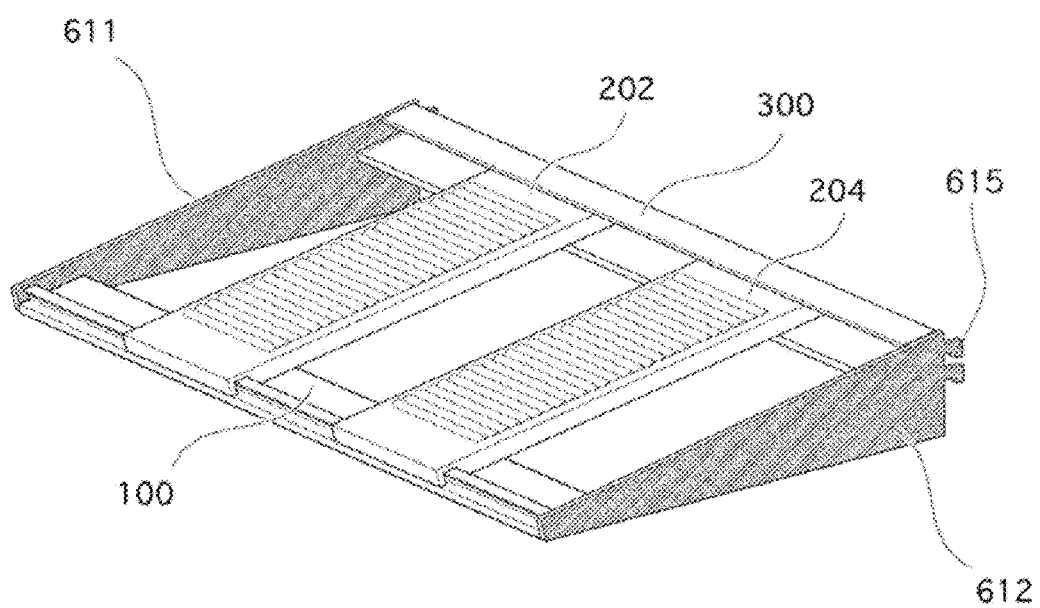
FIG. 8 is a perspective view illustrating a goods display rack having brackets mounted thereto.

Meanwhile, the goods display rack 10 according to an embodiment of the present disclosure may further include brackets 611 and 612. FIG. 8 is a perspective view illustrating the goods display rack 10 having the brackets 611 and 612 mounted thereto. As illustrated, the brackets 611 and 612 are configured to connect the front fixing profile 100 to the rear fixing profile 300, and include the first bracket 611 attached to the front fixing profile 100 and the rear fixing profile 300, on the left end portion of the goods display rack 10, and the second bracket 612 attached to the front fixing profile 100 and the rear fixing profile 300, on the right end portion of the goods display rack 10. The goods display rack 10 may be installed on a display table of a fridge or a freezer by means of catching portions 615 formed on the brackets 611 and 612. When the goods display rack 10 is mounted on a display table, it is necessary to maintain a tilted state in which the front end 22 of the unit 20 is lower than the rear end 23 of the unit 20, so that a product mounted on the goods transfer unit 20 is transferred to a withdrawal position, that is, the front end 22 of the goods transfer unit 20 by gravity. For this purpose, the heights of the first bracket 611 and the second bracket 612 become larger toward the rears thereof, so that the front fixing profile 100 is lower than the rear fixing profile 300, as illustrated in FIG. 8.

Figure 9:
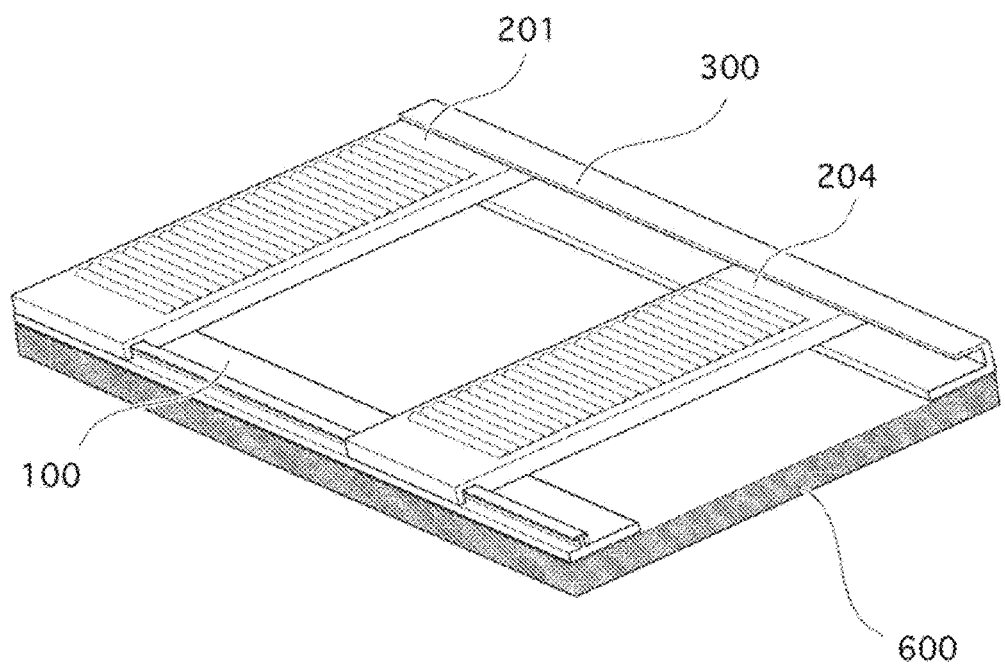
FIG. 9 is a perspective view illustrating a goods display rack having a panel mounted thereto.

Meanwhile, the goods display rack 10 according to an embodiment of the present disclosure may further include a panel 600. FIG. 9 is a perspective view illustrating the goods display rack 10 having the panel 600 mounted thereto. The panel 600 is bonded onto the bottom surfaces of the front end support plate 101 and the rear end support plate 301, thus supporting the front and rear fixing profiles 100 and 300 upward. In this embodiment, the goods display rack 10 may further include the afore-described brackets 611 and 612 in order to be mounted on a display table of a fridge or a freezer by means of the catching portions 615 formed in the brackets 611 and 612. Further, the goods display rack 10 may be mounted on a display table by a catching portion (not shown) formed on the panel 600.

Figure 10:
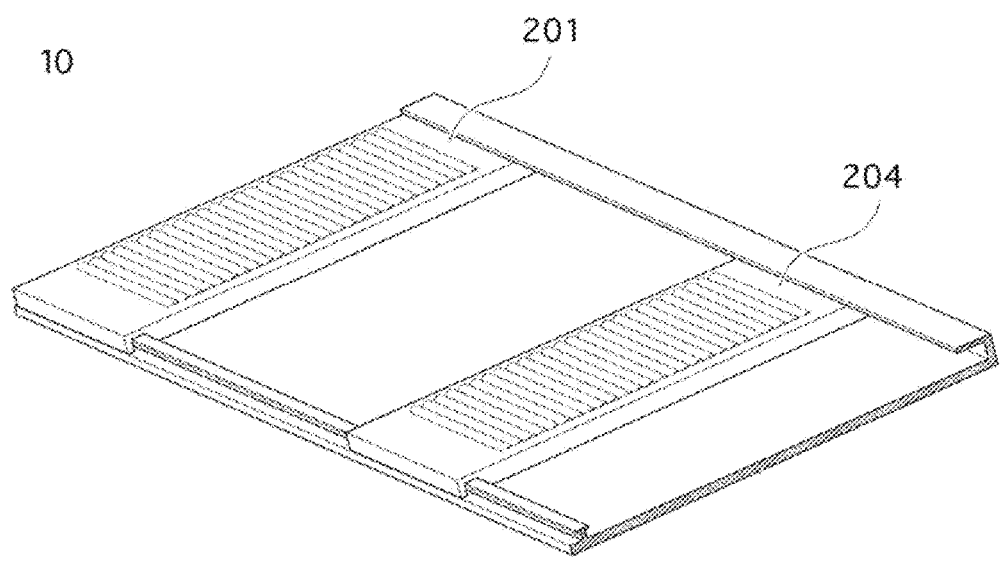
FIG. 10 is a perspective view illustrating a goods display rack having fixing profiles integrally formed thereon.

Meanwhile, in the goods display rack 10 according to an embodiment of the present disclosure, the front end support plate 101 of the front fixing profile 100 and the rear end support plate 301 of the rear fixing profile 300 may be integrally formed, as illustrated in FIG. 10. In this embodiment, the goods display rack 10 may further include the afore-described brackets 611 and 612 in order to be mounted on a display table of a fridge or a freezer by means of the catching portions 615 formed in the brackets 611 and 612.

In the goods display rack 10 including the above-described components according to an embodiment of the present disclosure, at least one goods transfer unit 20 is attachably/detachably installed to the fixing profiles 100 and 300, and the fixing profiles 100 and 300 are engaged with the brackets 611 and 612. Herein, the goods transfer rack 10 may be modified in various shapes by changing the types, number, and arrangement positions of goods transfer units 20.

Figure 11:
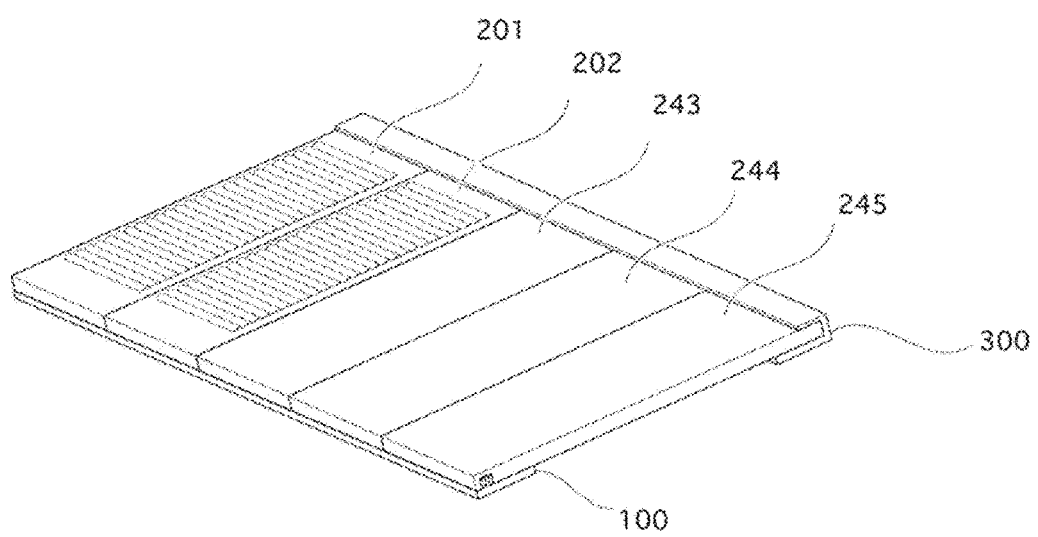
FIG. 11 is a perspective view illustrating an embodiment of a goods display rack in which various types of goods transfer units are combined.
Figure 12:
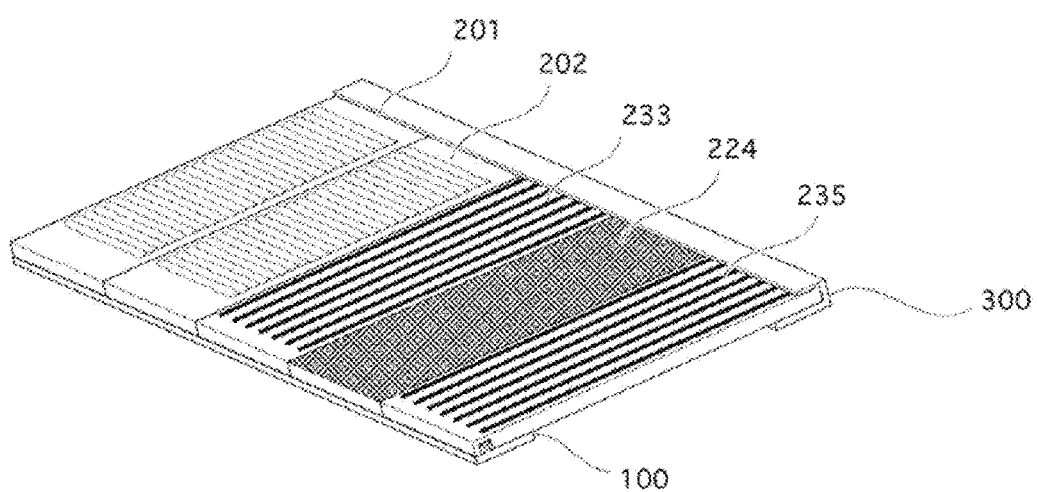
FIG. 12 is a perspective view illustrating another embodiment of a goods display rack in which various types of goods transfer units are combined.
Figure 13A:
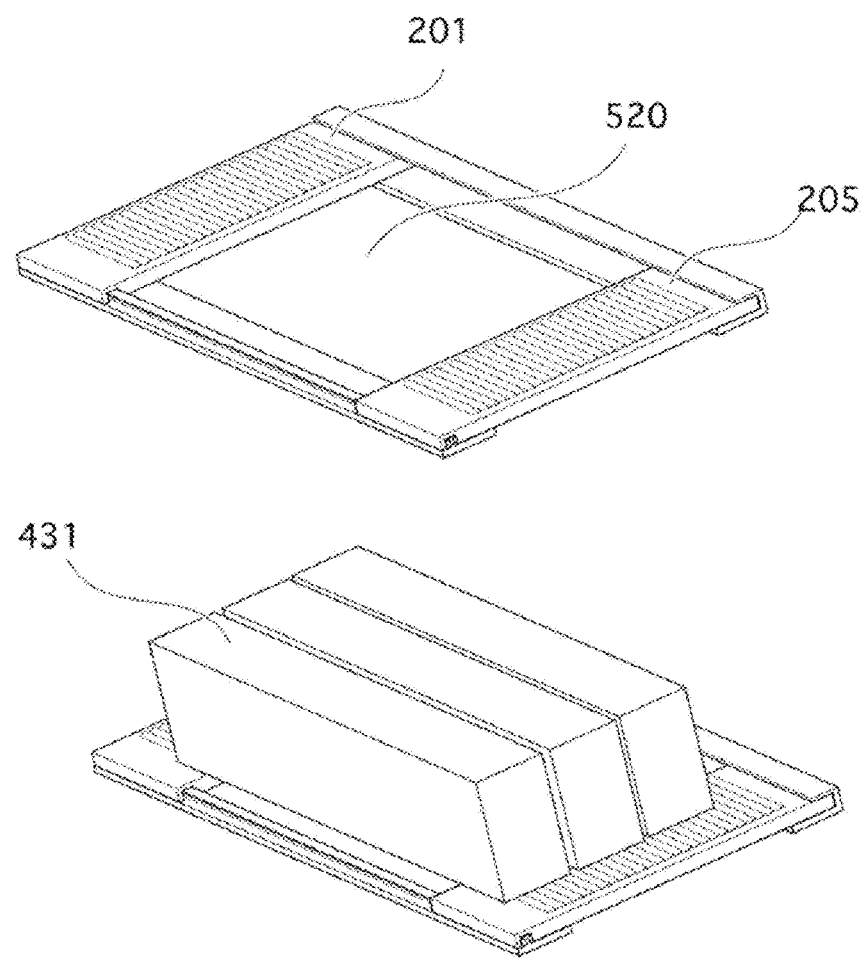
FIGS. 13a to 13d are exemplary views illustrating modified embodiments having different numbers of goods transfer units, and states in which products are arranged on goods display racks.
Figure 13B:
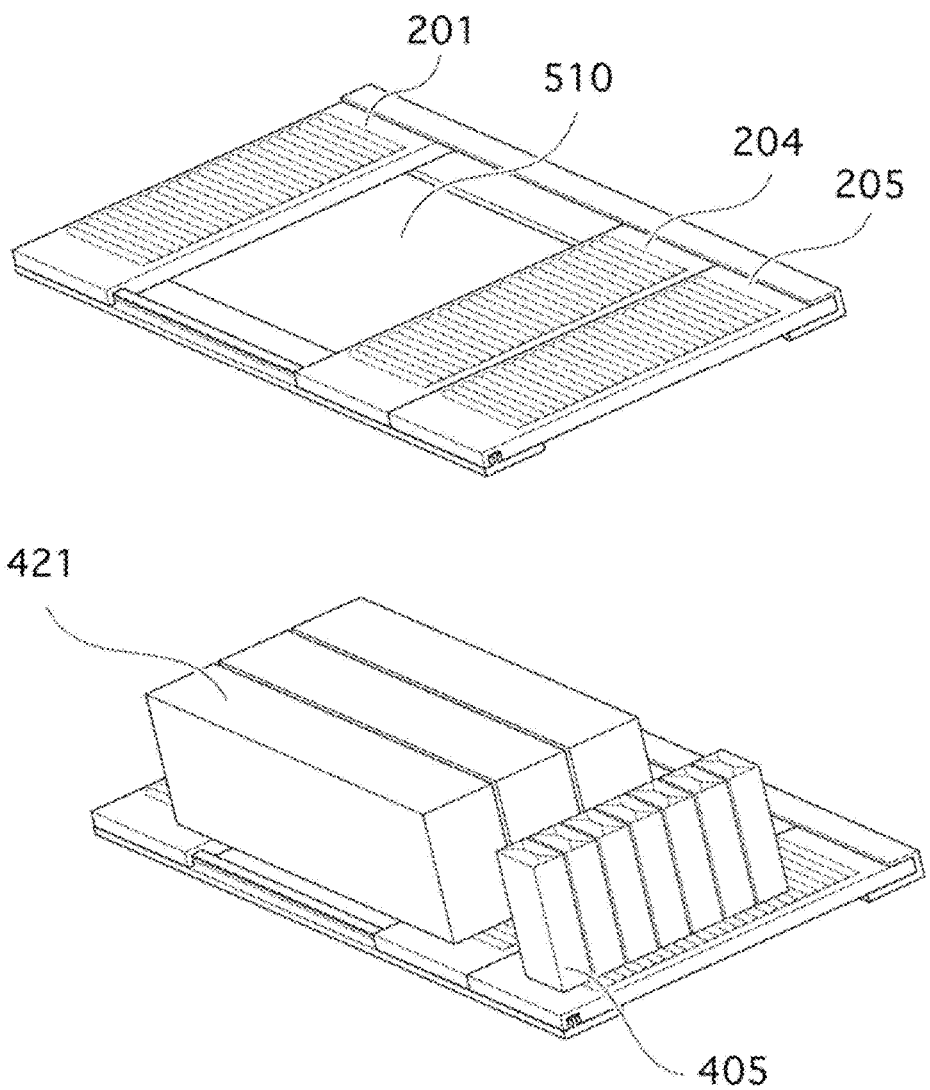
Figure 13C:
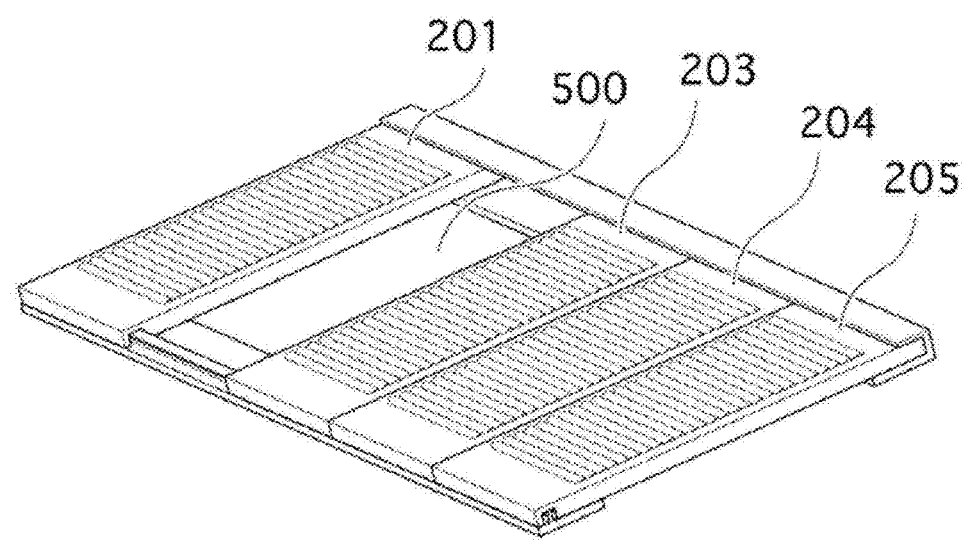
Figure 13C:
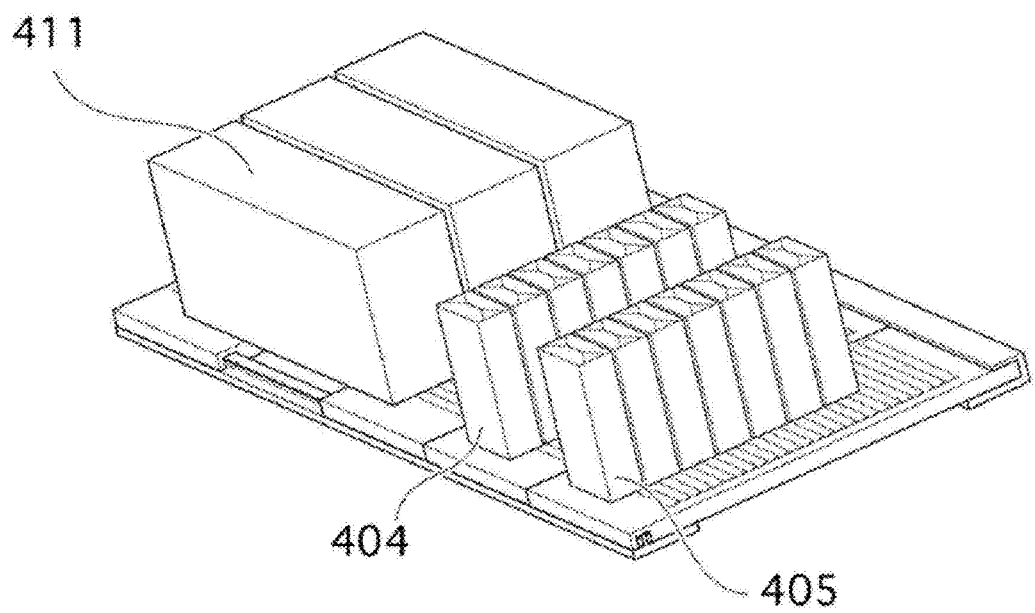
Figure 13D:
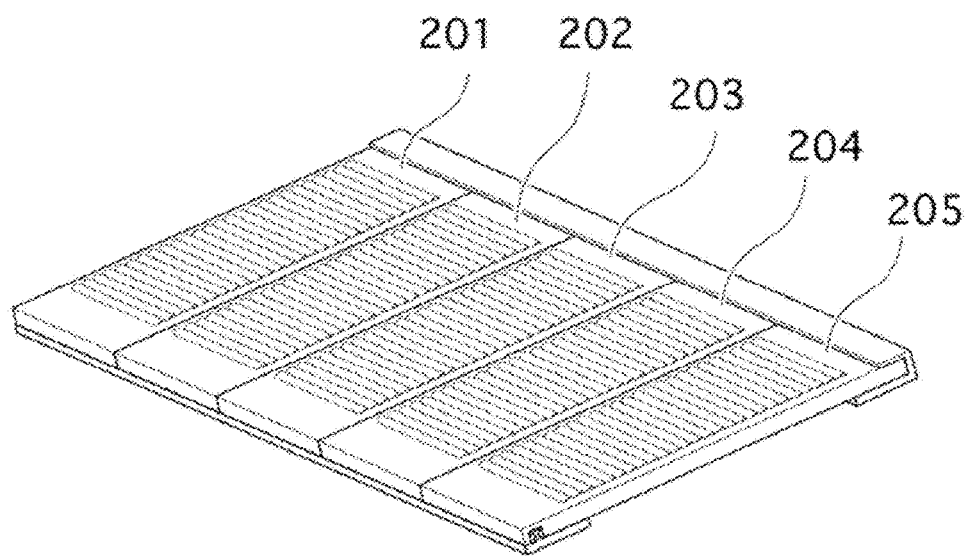
Figure 13D:
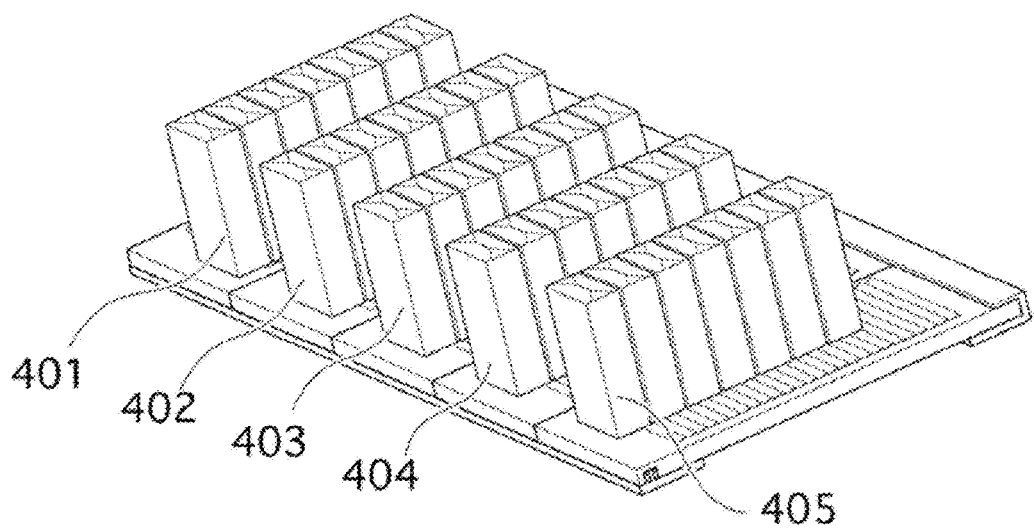

First, the goods display rack 10 may be modified in various shapes by changing the type of goods transfer units 20. As described before, the roller units 201 and 202 in which a plurality of rollers are rotatably engaged with a roller support, or units on which one of the surface-processed solid metal sheets 221 and 222, the thin gauge sheets 231 and 232 formed of synthetic resin by extrusion molding, and non-crystalline solid-overcooled liquid sheets are formed may be adopted as an embodiment of the goods transfer units 20. Or general units 243, 244, and 245 each having no auxiliary gravity movement means such as a roller or a sheet may be used as the goods transfer units 20. These types of goods transfer units 20 may be combined in various manners and mounted to the fixing profiles 100 and 300. For example, various modifications are available, such as a combination of the roller units 201 and 202 and the general units 243, 244, and 245, and a combination of units having the surface-processed sheets 233, 224, and 235 formed thereon and the roller units 201 and 202. FIG. 11 illustrates a modification example in which the two roller units 201 and 202 and the three general units 243, 244, and 245 are engaged with the fixing profiles 100 and 300, and FIG. 12 illustrates a modification example in which the two roller units 201 and 202 and units having the surface-processed sheets 233, 224, and 235 formed thereon are engaged with the fixing profiles 100 and 300.

Meanwhile, the goods display rack 10 may be modified in various shapes by changing the number of goods transfer units 20. FIGS. 13*a* to 13*d* are exemplary views illustrating modified embodiments having different numbers of goods transfer units, and states in which products are mounted on goods display racks. The number of goods transfer units may be controlled according to the widths of products mounted on the goods transfer units.

Figure 14A:
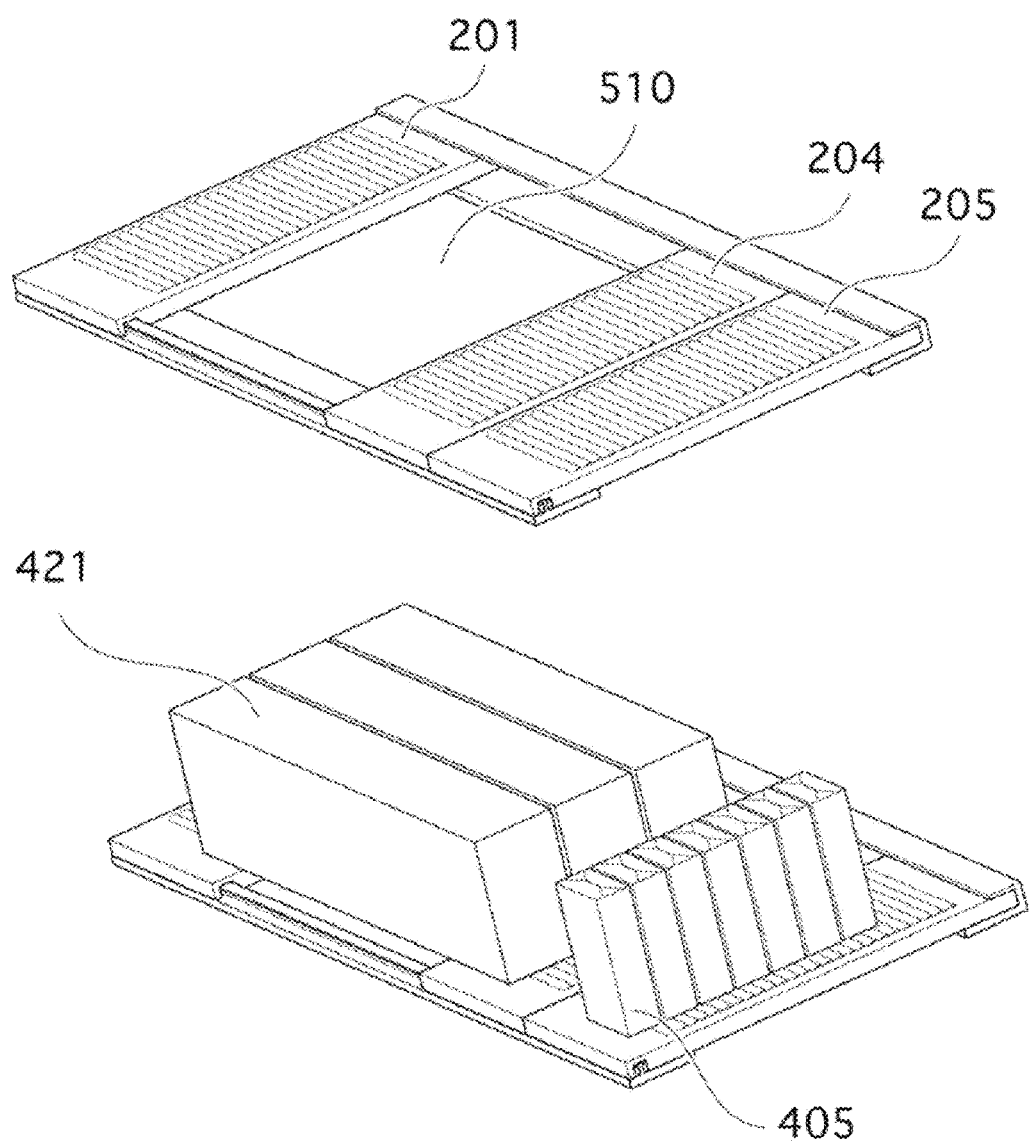
FIGS. 14a and 14b are exemplary views illustrating modified embodiments having three goods transfer units at different left and right arrangement positions, and states in which products are arranged on goods display racks.
Figure 14B:
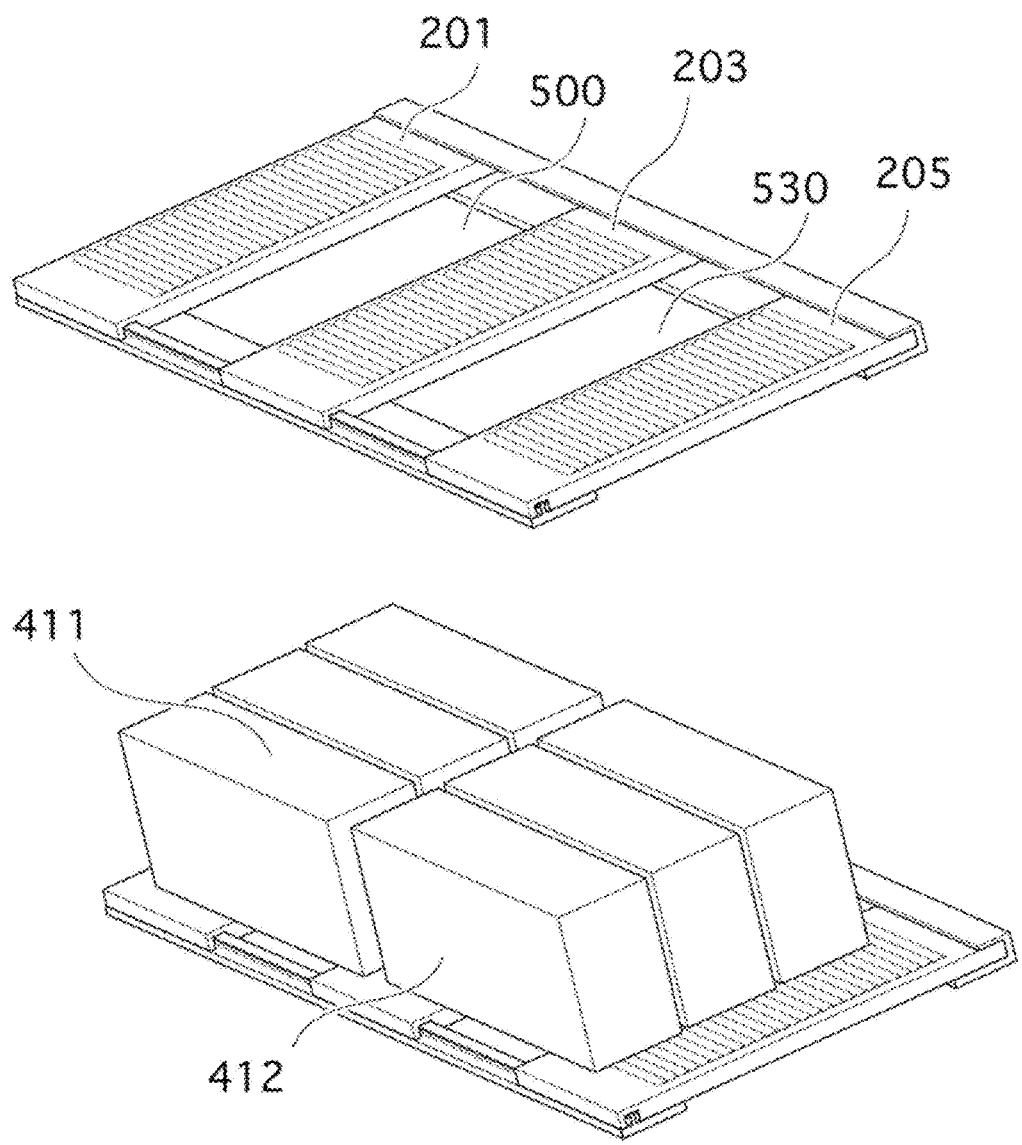
Figure 15A:
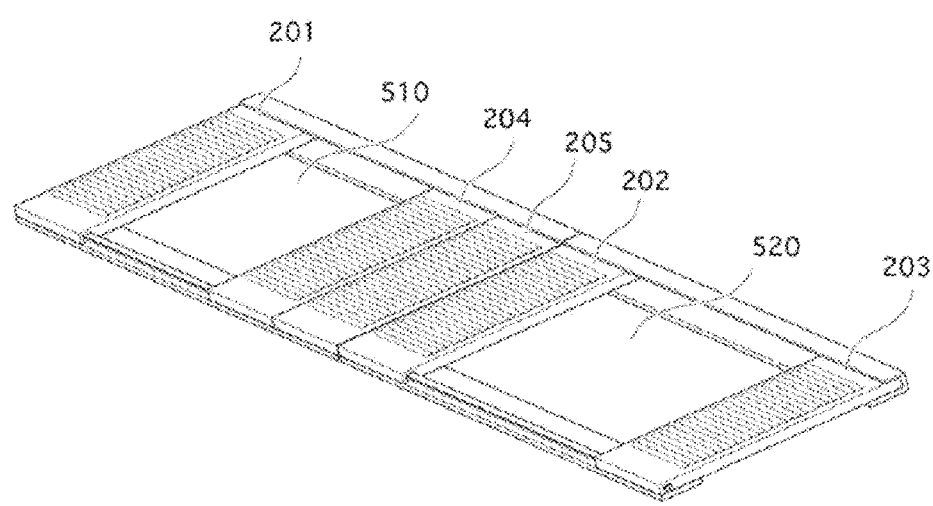
FIGS. 15a, 15b and 15c are exemplary views illustrating modified embodiments having five goods transfer units at different left and right arrangement positions, and states in which goods are arranged on goods display racks.
Figure 15A:
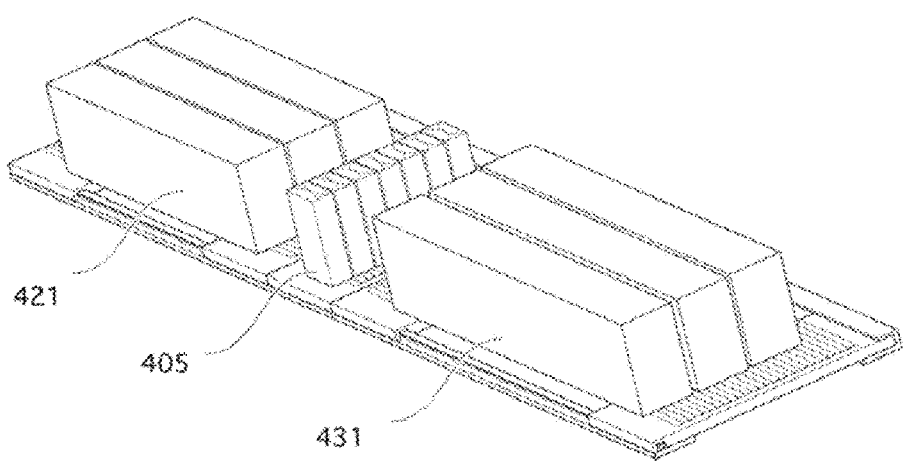
Figure 15B:
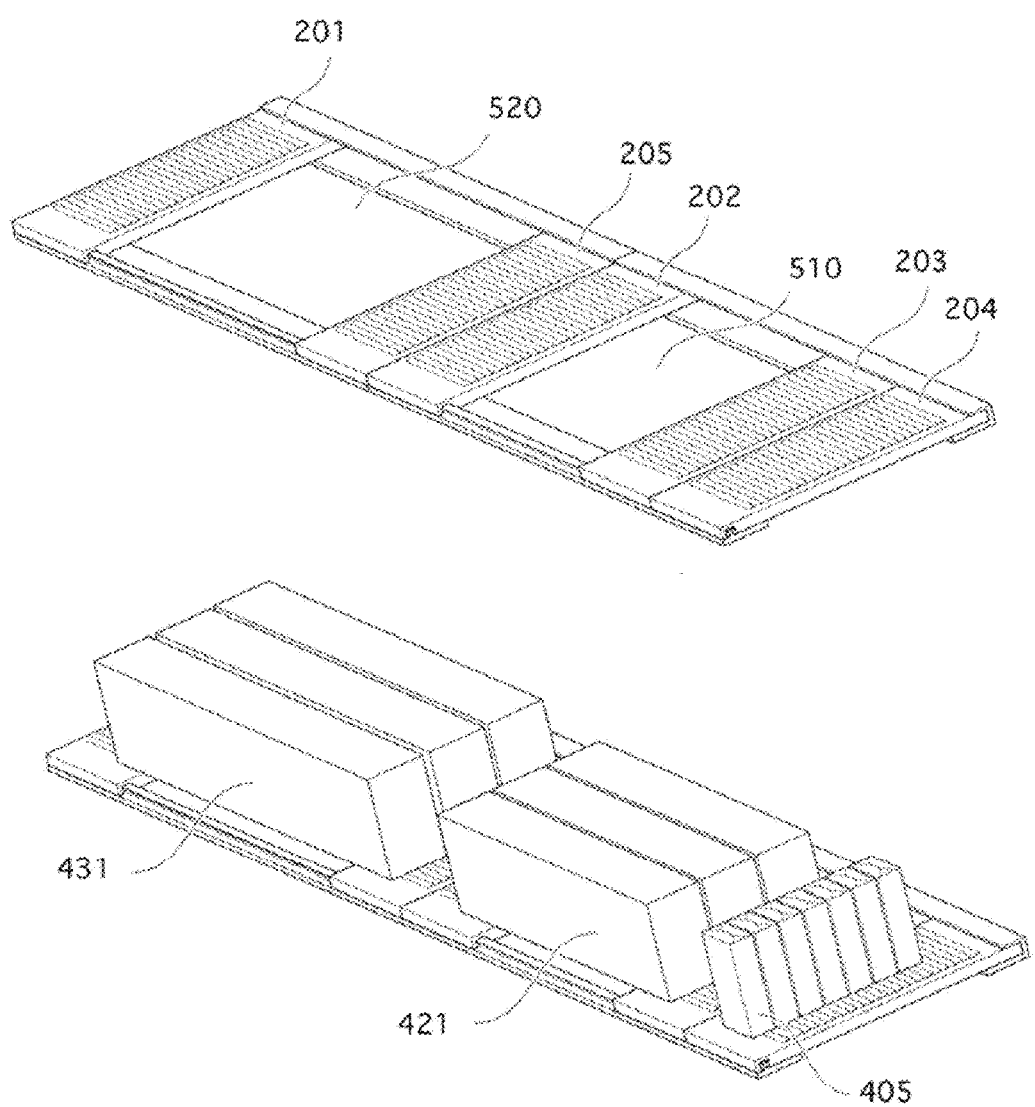
Figure 15C:
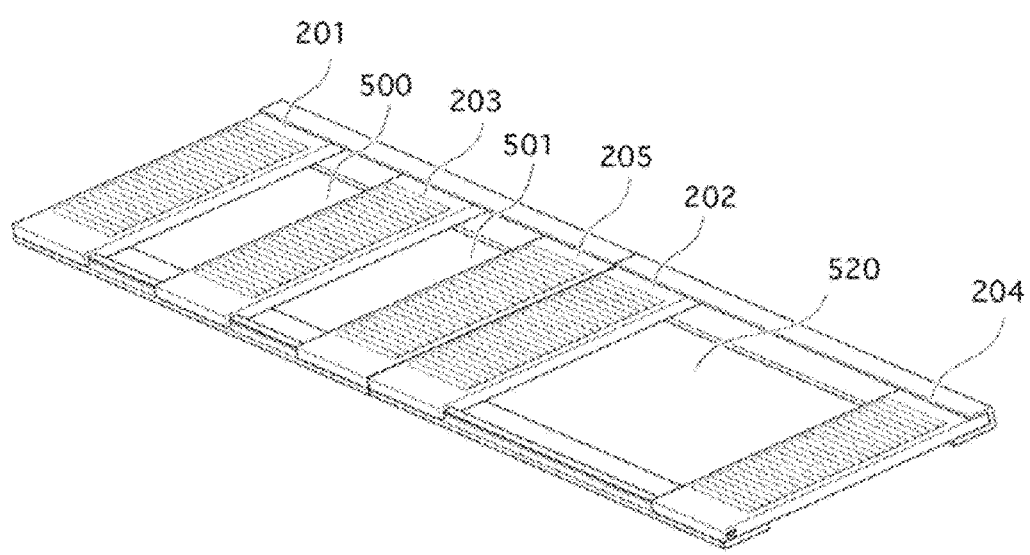
Figure 15C:
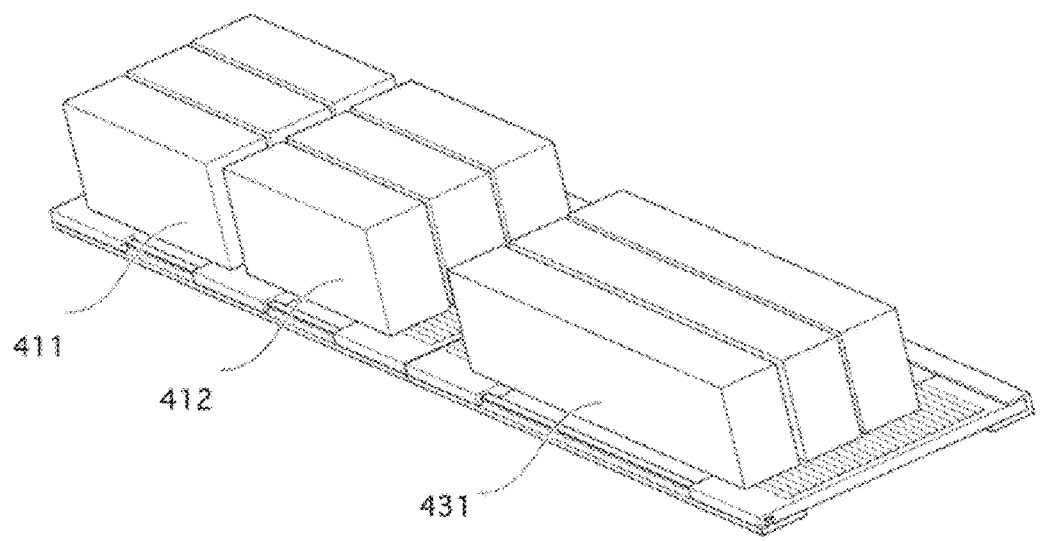

Meanwhile, the goods display rack 10 may be modified in various shapes by changing the arrangement positions of goods transfer units 20. FIGS. 14*a*, 14*b*, and 14*c* are exemplary views illustrating modified embodiments in which the arrangement positions of three goods transfer units 201, 204, and 205 are changed, and states in which products 405, 411, 412, 421, and 431 are arranged on goods display racks. The widths of spaces 500, 510, and 530 may be controlled by changing the positions of the goods transfer units. As illustrated, it is possible to freely control the left and right arrangement positions of goods transfer units according to the widths of products mounted on the goods transfer units.

One of the technical features of the present disclosure is to configure the goods transfer unit 20 to be slidable from side to side on the goods display rack 10. That is, with the front end 22 and rear end 23 of the goods transfer unit 20 fixed respectively to the front fixing profile 100 and the rear fixing profile 300, the goods transfer unit 20 is configured to be slidable from side to side in the position adjustment area 500 between the front fixing profile 100 and the rear fixing profile 300. Herein, if external force greater than frictional force between the bumpers 24 formed in the recess 21 of the unit 20 and the protrusion 111 of the fixing profile 100, or adhesive force between the recess 21 and the magnetic device or double-sided Velcro device formed on the flange 112 of the protrusion 111 is exerted to the front end 22 of the unit 20, the recess 21 of the unit 20 is forced to slide from side to side over the protrusion 111 of the front fixing profile 100 by this external force, and external force greater than frictional force caused by contact between the accommodation space 331 of the rear fixing profile 300 and the rear end 23 of the unit 20, which is exerted to the rear end 23 of the unit 20 may cause the unit 20 to slide. Herein, the frictional force of the bumpers 24 and the protrusion 111 on the front end 22 of the unit 20 is changed according to the shape or material of the bumpers 24 or the protrusion 111, and the adhesive force of the recess 21 and the flange 112 is changed according to the type of the magnetic device or the Velcro device. In addition, this sliding takes place only when external force is exerted to the goods transfer unit 20, and if the external force is released, the goods transfer unit 20 is immediately stopped and fixed. According to this mechanism, the left and right arrangement positions or number of goods transfer units 20 in the position adjustment area 500 between the front and rear fixing profiles 100 and 300 may be changed easily. Therefore, the goods display rack 10 may be configured in various shapes according to a condition such as the left-right sizes of displayed products. As illustrated in the afore-described FIGS. 13, 14 and 15, a product to be displayed may be mounted on one unit according to the size of the product, or on two or more units, for stable display. If a product to be displayed is larger than the width of a unit, units are positioned at the positions of both ends of the product, thereby enabling stable mounting of the product. Accordingly, since a product may be mounted stably by adopting as many units as needed, cost may be saved, which might otherwise be caused by use of unnecessary units.

Meanwhile, another technical feature of the present disclosure is the attachment and detachment mechanism of the goods transfer unit 20. That is, it is preferred that the goods transfer unit 20 is vertically attached to and detached from the front fixing profile 100, and horizontally attached to and detached from the rear fixing profile 300 in order to facilitate attachment and detachment of the goods transfer unit 20 to and from the fixing profiles 100 and 300. More specifically, after the rear end 23 of the unit 20 is horizontally inserted into the accommodation space 331 of the rear fixing profile 300 in the attachment procedure, the front end 22 of the unit 20 is lowered vertically toward the front fixing profile 100 and the protrusion 111 of the front fixing profile 100 is inserted into the recess 21 of the unit 20. Herein, the front end 22 of the unit 20 and the front fixing profile 100 are attached to each other by a magnetic force or in a Velcro manner, using the magnetic devices or the double-sided Velcro devices formed on the bottom surface 21A of the recess 21 and the flange 112 of the front fixing profile 100. Meanwhile, in contrast to the attachment mechanism, the unit 20 is removed vertically from the front fixing profile 100 by applying external force to the front end 22 of the unit 20 vertically from above. After the removal, the read end 23 of the unit 20 is withdrawn from the accommodation space 331 of the rear fixing profile 300 by applying horizontal external force forward to the rear end 23 of the unit 20. According to this structure, since the goods transfer unit 20 may be basically attached or detached easily, the shape of the goods display rack 10 may be easily changed. Further, only a defective or broken goods transfer unit 20 is replaced with a new one, thereby enabling continuous use of the goods display rack 10. Therefore, the shortcoming of the conventional goods display rack that the rack itself should be replaced may be overcome.

While the present disclosure has been described with reference to the embodiments, those skilled in the art will appreciate that many modifications and variations can be made to the present disclosure by adding, changing, or removing a component without departing from the spirit and scope of the present disclosure, and are also included in the scope of the present disclosure.

DESCRIPTION OF REFERENCE NUMERALS

10: goods display rack
20: goods transfer unit
21: recess
21A: bottom surface
21B: opposite surface
24: bumper
100: front fixing profile
101: front end support plate
111: protrusion
112: flange
300: rear fixing profile
301: rear end support plate
302: auxiliary plate
331: accommodation space
500: position adjustment area
600: panel
611: first bracket
612: second bracket

The invention claimed is:

1. A goods display rack comprising:
    at least one goods transfer unit configured to transfer a product mounted on a top surface thereof to a withdrawal position;
    a front fixing profile disposed on a front of the goods display rack, and configured to attachably or detachably fix a front end of the goods transfer unit; and
    a rear fixing profile disposed on a rear of the goods display rack, and configured to attachably or detachably fix a rear end of the goods transfer unit,
    wherein the goods transfer unit is configured to slide from side to side in a position adjustment area between the front fixing profile and the rear fixing profile, with the front end and the rear end thereof mounted respectively to the front fixing profile and the rear fixing profile,
    wherein the goods transfer unit includes a recess on a bottom surface thereof, and the front fixing profile includes a protrusion on a top surface thereof and a flange formed on a top end of the protrusion, and
    wherein a bottom of the recess and a top surface of the flange are magnetically coupled or Velcro coupled.

2. The goods display rack according to claim 1, wherein the recess is extended along a left and a right directions of the goods display rack, and
    wherein the front fixing profile comprises:

a front end support plate supporting the front end of the goods transfer unit upward, under the goods transfer unit; and the protrusion configured to protrude from a top surface of the front end support plate, extended along the left and right directions, and to be inserted into the recess of the goods transfer unit.

3. The goods display rack according to claim 2, wherein the rear fixing profile comprises:

a rear end support plate supporting the rear end of the goods transfer unit upward, under the goods transfer unit; and an auxiliary plate extended upward from the rear end support plate, and then forward above the rear end support plate, and wherein an accommodation space is formed in the rear fixing profile, extended along the left and right directions by the rear end support plate and the auxiliary plate, and the rear end of the goods transfer unit is accommodated in the accommodation space.

4. The goods display rack according to claim 3, wherein the front end of the goods transfer unit is vertically detachable from the front fixing profile, and the rear end of the goods transfer unit is horizontally detachable from the rear fixing profile.

5. The goods display rack according to claim 4, wherein when the goods transfer unit is engaged with the fixing profiles, the rear end of the goods transfer unit is horizontally inserted into the accommodation space of the rear fixing profile, and the protrusion of the front fixing profile is vertically inserted into the recess of the front end of the goods transfer unit, and wherein when the goods transfer unit is removed from the fixing profiles, the protrusion of the front fixing profile is vertically detached from the recess of the front end of the goods transfer unit, and the rear end of the goods transfer unit is horizontally detached from the accommodation space of the rear fixing profile.

6. The goods display rack according to claim 2, wherein the recess comprises a bottom surface, and two opposite surfaces facing each other, with the bottom surface in between, and wherein a magnetic device or a double-sided Velcro device is formed on each of the bottom surface of the recess and the top surface of the flange.

7. The goods display rack according to claim 6, wherein bumpers are formed apart from each other on the two opposite surfaces, extended along the left and right directions of the recess, and wherein when the protrusion is inserted into the recess, the front end of the goods transfer unit and the front fixing profile are engaged with each other by forced insertion of the protrusion into the recess through temporary friction between the flange and the bumpers, and when the protrusion is detached from the recess, the front end of the goods transfer unit and the front fixing profile are separated from each other through temporarily friction between the flange and the bumpers.

8. The goods display rack according to claim 1, wherein the goods transfer unit is a roller unit in which a plurality of rollers are rotatably engaged with a roller support.

9. The goods display rack according to claim 1, wherein one of a surface-processed solid metal sheet, a thin gauge sheet formed of synthetic resin by extrusion molding, and a non-crystalline solid-overcooled liquid sheet is formed on the top surface of the goods transfer unit.

10. The goods display rack according to claim 3, further comprising a panel bonded to the front end support plate and the rear end support plate, and supporting the front fixing profile and the rear fixing profile upward.

11. The goods display rack according to claim 1, further comprising a first bracket and a second bracket attached to the front fixing profile and the rear fixing profile, respectively on left and right end portions of the goods display rack, wherein heights of the first and the second brackets become larger toward rears of the first and the second brackets.

12. The goods display rack according to claim 3, wherein the front end support plate of the front fixing profile and the rear end support plate of the rear fixing profile are integrally formed.

13. A goods display rack comprising:

at least one goods transfer unit configured to transfer a product mounted on a top surface thereof to a withdrawal position;

a front fixing profile disposed on a front of the goods display rack, and configured to attachably or detachably fix a front end of the goods transfer unit; and a rear fixing profile disposed on a rear of the goods display rack, and configured to attachably or detachably fix a rear end of the goods transfer unit, wherein the goods transfer unit is configured to slide from side to side in a position adjustment area between the front fixing profile and the rear fixing profile, with the front end and the rear end thereof mounted respectively to the front fixing profile and the rear fixing profile, wherein the goods transfer unit includes a recess on a bottom surface thereof, and the recess comprises a bottom surface, two opposite surfaces facing each other with the bottom surface in between, and bumpers formed apart from each other on the two opposite surfaces, wherein the front fixing profile includes a protrusion on a top surface thereof, and a flange is formed on a top end of the protrusion, wherein the bottom surface of the recess and a top surface of the flange are magnetically coupled or Velcro coupled, and wherein when the protrusion is inserted into the recess, the front end of the goods transfer unit and the front fixing profile are engaged with each other by forced insertion of the protrusion into the recess through temporary friction between the flange and the bumpers, and when the protrusion is detached from the recess, the front end of the goods transfer unit and the front fixing profile are separated from each other through temporarily friction between the flange and the bumpers.

* * * * *